United States Patent [19]

Cain

[11] Patent Number: 4,730,946
[45] Date of Patent: Mar. 15, 1988

[54] PRECISION BEARING ASSEMBLY AND METHOD

[75] Inventor: Earl S. Cain, Napa, Calif.

[73] Assignee: Tribotech, Napa, Calif.

[21] Appl. No.: 40,605

[22] Filed: Apr. 21, 1987

[51] Int. Cl.$^4$ .......................... F16C 33/60; B24B 1/00; B21D 53/12; B21K 1/04
[52] U.S. Cl. ................................. 384/506; 29/148.4 R; 29/445; 29/526 R; 51/291; 384/504; 384/510; 384/542; 403/14
[58] Field of Search .................. 384/499–506, 384/510, 512, 541, 542; 51/291, 15; 403/13, 14, 21, 335–337; 29/148.4 R, 148.4 A, 148.4 B, 445, 526 R

[56] References Cited

U.S. PATENT DOCUMENTS

| | | | |
|---|---|---|---|
| 1,222,846 | 4/1917 | Carlson | 29/148.4 A X |
| 1,325,910 | 12/1919 | Reynolds | 384/504 |
| 1,373,139 | 3/1921 | Lindman | 384/506 X |
| 1,379,945 | 5/1921 | Teetsow | 384/504 |
| 2,075,280 | 3/1937 | Green | 384/504 |
| 2,651,554 | 9/1953 | Recknagle | 384/504 |
| 3,501,208 | 3/1970 | Kessler | 29/148.4 A X |
| 3,651,550 | 3/1972 | Bennett | 29/148.4 A |
| 3,986,754 | 10/1976 | Torrant | 384/504 |
| 4,498,798 | 2/1985 | Day | 403/13 X |

Primary Examiner—Stuart S. Levy
Assistant Examiner—Thomas R. Hannon
Attorney, Agent, or Firm—Flehr, Hohbach, Test, Albritton & Herbert

[57] ABSTRACT

A bearing assembly comprising inner and outer rings provided with cooperating axially outwardly and inwardly facing bearing races in which the ring having axially inwardly facing races is split into two portions which are secured to one another to retain bearing races and which are radially and circumferentially positioned and secured to one another. A method of forming a precision bearing assembly as described.

4 Claims, 2 Drawing Figures

PRECISION BEARING ASSEMBLY AND METHOD

This invention relates generally to a precision ball bearing and method of assembly.

Ball bearings having two rows of balls may include ball loading slots, or filling holes, which interrupt the races of the inner or outer rings or both. This introduces discontinuities in the races resulting in imprecise rotation and dynamic geometry of the bearing. Bearings having split inner or outer rings including races are used to permit insertion of the ball rows without the use of loading slots or holes. However, when split inner or outer rings are assembled, there is usually a loss of concentricity between the races on the respective ring portions because the rings cannot be repositioned during assembly to their accurately ground position.

It is a general object of the present invention to provide and improve split ring bearing assembly and method.

It is another object of the present invention to provide a ball bearing assembly in which the split ring halves band diameter and races are concentrically ground. The split ring can be separated for loading and reassembled using a centering band, in contact with both split ring halves centering band diameters, to maintain concentricity of the bearing race diameters.

It is a further object of the present invention to provide a bearing assembly including a split ring in which the ring portions are aligned by a centering band and circumferentially positioned, or keyed with an engaging pin or bolt, so that the ground races remain concentric and angularly repositioned as originally ground during final assembly and disassembly.

The foregoing is achieved by a bearing assembly which includes inner and outer rings provided with cooperating bearing races in which at least one of the rings is split to form two mating ring positions and a centering band cooperates between said mating ring portions to position the split portions one with respect to the other and subject to a non-symmetrical bolt set for circumferential and angular alignment.

There is also described a method of forming a bearing including a split ring which comprises the steps of centering the split ring portions with respect to one another, while circumferentially orienting the rings for grinding the races and re-orientation diameter on each of the split rings whereby they can be disassembled and reassembled while maintaining concentricity and proper circumferential angularity of the races by utilizing a centering ring tightly fitting the re-orientation diameters.

The foregoing and other objects of the invention will be more clearly understood from the following description taken in connection with the drawings of which:

Figure 1:
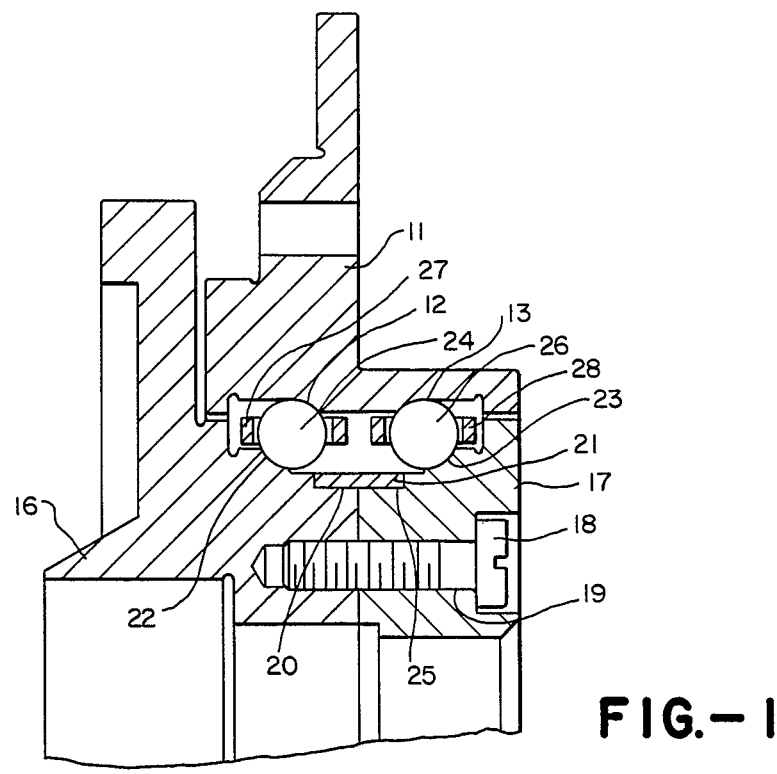
FIG. 1 is a partial sectional view of a ball bearing in accordance with the present invention.
Figure 2:
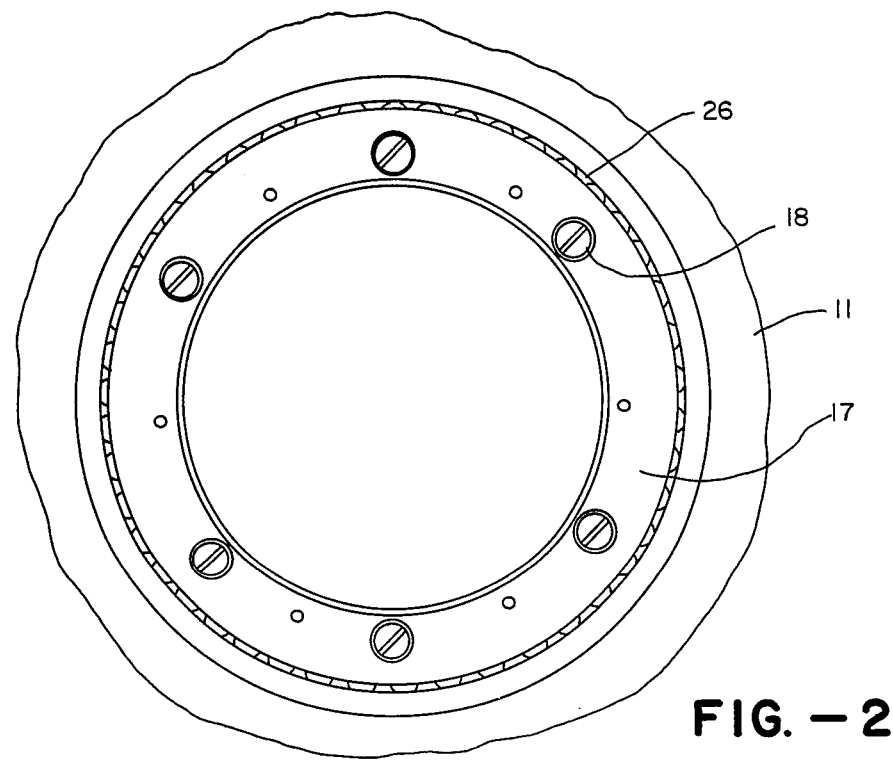
FIG. 2 is a view taken along the line 2 of FIG. 1.

A bearing assembly in accordance with the present invention is shown in the Figures and includes an outer bearing ring 11 which includes spaced axially outwardly facing bearing races 12 and 13. The bearing includes an inner split ring comprising ring portions 16 and 17 secured to one another by a plurality of unequally spaced screws 18 which pass through holes 19 in portion 17 and are threadably received by the portion 16. The outer and inner rings are adapted to be secured cooperating parts which are to be precisely rotated with respect to one another.

The ring portions 16 and 17 are maintained in axial alignment by centering ring, or collar, 21 which fits tightly with the circumferential facing diameters 20 and 25. The ring portions 16 and 17 includes axially inwardly facing ground races 22 and 23 respectively which cooperate with the corresponding races 12 and 13 of the outer ring. The cooperating races accommodate rows of balls 24 and 26 which are maintained in spaced relationship by ball cages 27 and 28 respectively.

In accordance with the present invention the inner ring is assembled from the two portions 16 and 17. Thereafter the diameters 20 and 25 and the bearing races 22 and 23 are ground. The ring 17 is removed and the bearing row 24 with its bearing cage 27 is placed on the race 22, after centering ring 21 has been fitted onto diameter 20, thereafter the outer ring 11 is inserted to bring the race 12 into contact with the wall balls 24. The bearing row 26 and its cage 28 is then inserted and the inner ring portion 17 is inserted into ball row 26 while engaging centering ring 21 onto ring 17 diameter 25 and secured by the screws 18. The races are maintained concentric by the ring or collar 21. The rings are circumferentially positioned one with respect to the other by unequally spacing the bolt holes 19 and threaded walls whereby the parts can only be assembled in one circumferential position.

It is of course apparent that rather than splitting the inner ring, the outer ring may be split and aligned in the same manner. The circumferential location may be assured by indexing scribes in the outer or inner surface of the ring portions. Other designs of precision bearings including two rows of balls may be formed in accordance with the present invention.

What is claimed is:

1. A bearing assembly comprising inner and outer rings provided with cooperating axially outwardly and inwardly facing bearing races in which the ring having axially inwardly facing races is split to form two ring portions each of said ring portions having a centering recess, the centering recesses facing one another, a centering band disposed in said recesses to radially align said ring portions one with respect to the other, means for circumferentially locating said ring portions with respect to one another, and means for securing said ring portions to one another at said circumferential location.

2. A bearing as in claim 1 wherein said inner ring is split into two ring portions.

3. A bearing assembly as in claim 1 in which said securing means comprises screws for securing one ring portion to the other with said screws being located so that the ring portions can only be secured in one circumferential position.

4. The method of forming and assembling a precision bearing assembly including inner and outer rings comprising the steps of forming on one of said rings precision axially outwardly facing bearing races, splitting said other ring into two ring portions, forming in said ring portions centering recesses, applying a centering band to said ring portion at said recesses and securing said portions to one another, forming on each of said ring portions axially inwardly facing bearing races, disassembling said ring portions, inserting a first bearing row in the facing races of one of said portions and the other ring, inserting a second bearing row on the other face of said other ring, inserting said other ring portion and centering the portions by said centering band, and securing said ring portions to one another in the same circumferential alignment as when the grooves were formed.

* * * * *